United States Patent

Rose

Patent Number: 5,874,003
Date of Patent: Feb. 23, 1999

[54] WASTEWATER TREATMENT APPARATUS WITH FLOATING CLARIFIER

[76] Inventor: Bryan L. Rose, 2760 Glencairin Dr. NW., Grand Rapids, Mich. 49504

[21] Appl. No.: 882,205

[22] Filed: Jun. 25, 1997

[51] Int. Cl.$^6$ .............................. B01D 21/02; C02F 3/22
[52] U.S. Cl. ......................... 210/626; 210/629; 210/122; 210/195.4; 210/242.1; 210/521
[58] Field of Search .................................... 210/620, 626, 210/629, 122, 195.3, 195.4, 242.1, 242.2, 521, 532.1, 538, 540

[56] References Cited

U.S. PATENT DOCUMENTS

| | | |
|---|---|---|
| Re. 32,562 | 12/1987 | Litz . |
| 3,051,315 | 8/1962 | Boester ................................ 210/195.4 |
| 3,273,865 | 9/1966 | White . |
| 3,275,157 | 9/1966 | Stamps .................................... 210/521 |
| 3,416,729 | 12/1968 | Ravitts et al. . |
| 3,521,864 | 7/1970 | Welles, Jr. . |
| 3,572,658 | 3/1971 | Ravitts . |
| 3,613,889 | 10/1971 | Reed ..................................... 210/242.1 |
| 3,907,672 | 9/1975 | Milne ................................... 210/195.4 |
| 4,086,306 | 4/1978 | Yoshinaga . |
| 4,089,620 | 5/1978 | Ravitts . |
| 4,305,819 | 12/1981 | Kobozev et al. ..................... 210/242.1 |
| 4,328,175 | 5/1982 | Roeckel et al. . |
| 4,362,625 | 12/1982 | Beard .................................... 210/521 |
| 4,446,018 | 5/1984 | Cerwick ............................... 210/195.4 |
| 4,454,077 | 6/1984 | Litz . |
| 4,455,239 | 6/1984 | Morrow et al. ......................... 210/521 |
| 4,465,645 | 8/1984 | Kaelin . |
| 4,468,358 | 8/1984 | Haegeman . |
| 4,514,303 | 4/1985 | Moore .................................... 210/521 |
| 4,540,528 | 9/1985 | Haegeman . |
| 4,681,711 | 7/1987 | Eaton . |
| 4,734,235 | 3/1988 | Holyoak . |
| 4,743,367 | 5/1988 | Zeilon . |
| 4,749,480 | 6/1988 | Luhrs et al. ......................... 210/195.4 |
| 4,749,493 | 6/1988 | Hicks . |
| 4,956,100 | 9/1990 | Mikkleson ............................. 210/122 |
| 5,009,816 | 4/1991 | Weise et al. . |
| 5,011,372 | 4/1991 | Nigrelli et al. . |
| 5,021,154 | 6/1991 | Haegeman . |
| 5,035,795 | 7/1991 | Schmid . |
| 5,110,510 | 5/1992 | Norcross . |
| 5,213,718 | 5/1993 | Burgess . |
| 5,275,762 | 1/1994 | Burgess . |
| 5,534,141 | 7/1996 | McAnaney et al. ................. 210/242.1 |

OTHER PUBLICATIONS

Scroggins & Deiters, Wastewater Cleanup: Put Activated Sludge Treatment to Work, *Environmental Engineering World*, Nov.–Dec. 1995, at 22.

Praxair, Inc. In–Situ Oxygenator diagram.

*Primary Examiner*—Christopher Upton
*Attorney, Agent, or Firm*—Warner Norcross & Judd LLP

[57] ABSTRACT

A wastewater treatment apparatus including a biotreatment tank and a floating clarifier within the tank. The floating clarifier includes a floating base and a perimeter wall mounted to and beneath the floating base. A plurality of tented panels mounted to the clarifier walls forms an apertured bottom of the floating clarifier having a plurality of tortuous outlets. The biotreated wastewater from the biotreatment tank enters the floating clarifier, where the suspended solids within the biotreated water settle and descends out of the apertured bottom of the clarifier. The biotreatment tank and clarifier operate continuously while equalizing variations in the wastewater feed rate.

17 Claims, 3 Drawing Sheets

WASTEWATER TREATMENT APPARATUS WITH FLOATING CLARIFIER

BACKGROUND OF THE INVENTION

The present invention relates to wastewater treatment apparatus, and more particularly to a continuous wastewater treatment apparatus incorporating a floating clarifier.

Wastewater from municipal sewage or industrial waste systems is treated prior to release to the environment to meet strict government standards for water quality. This treatment often includes biological treatment processes to degrade the organic contaminates in the wastewater. Biological treatment involves balancing several conditions—for example, the amount of organic waste, the amount of microbes, and the amount of oxygen—so that the microbes convert the organic waste to carbon dioxide and more microbes.

Biological treatment systems include: (1) a biological reactor, (2) a clarifier, and often (3) equalization capacity. The biological reactor includes a tank and an aeration device. Many different aeration devices are known in the art, including coarse-bubble diffusers and impeller draft tubes. In the reactor, the wastewater is aerated so that the microbes suspended in the wastewater consume the organic matter.

After biotreatment, the biologically treated wastewater is fed to a clarifier. The clarifier is a device for settling or separating biological solids from the biologically treated wastewater to produce clarified effluent. The clarifier also concentrates the suspended solids—which includes the microbes—in an underflow stream from the bottom of the clarifier. The underflow returned to the biological reactor is known as "return activated sludge" (RAS). The portion of these solids wasted from the system are known as "waste activated sludge" (WAS). The clarifier typically includes a tank designed to provide sufficient surface area so that the suspended solids in the biologically treated wastewater can settle and concentrate. Several types of clarifiers are known in the art; any geometric shape can be used, for example, circular, square, and rectangular. A variety of sludge removal mechanism exist, including hopper-bottom clarifiers and mechanical clarifiers. The underflow solids from the clarifier are returned to the biological reactor. WAS is removed from the system for further processing and/or disposal, as is known in the art. The clarified, biologically treated wastewater ("treated wastewater") is then discharged for further treatment or directly to the receiving stream.

Equalization refers to capacity of the wastewater treatment facility to store wastewater feed (organic loading) surges above the design capacity until the system can treat the wastewater during subsequent, less-than-capacity demands. Flow equalization may be used to improve clarification ("hydraulic equalization"). Equalization typically involves retrofitting an existing wastewater treatment facility by installation of additional tankage prior to aeration (biological reactor).

It is known to provide equalization by designing a biological treatment unit with built-in equalization capacity. This combination is known in the art as a "variable depth reactor" (VDR), as described in Scroggins & Deiters, *Wastewater Cleanup: Put Activated-Sludge Treatment to Work*, Environmental Engineering World, November–December 1995, at 22. The wastewater can flow to the VDR at varying rates, yet biotreated wastewater can be drawn for clarification at a consistent, continuous rate. However, the VDR requires a separate clarification unit, which adds to the cost of the treatment system and increases its complexity of operation.

It is also known to utilize a single tank for biological treatment and clarification using batch (non-continuous) processing. This system is known in the art as a "sequencing batch reactor" (SBR). A "batch" of wastewater is fed to the SBR tank, where the wastewater is aerated to effect biological reaction and then settled for clarification. A portion of the settled solids is wasted directly from the SBR tank. Typically, a wastewater system using SBR technology cycles the wastewater flow stream between two SBR tanks in order to provide wastewater treatment that is more continuous than a single SBR tank. In tandem operation, one SBR tank in effect provides equalization capacity while the other SBR tank processes the wastewater.

SBR technology has several disadvantages associated with batch processing. First, the entire wastewater flow to an SBR tank must be discharged after treatment in a fraction of the time that is available for loading the tank. This increases the size and cost of discharge facilities and piping relative to a continuous process. Also, since the aeration requirements must be met in a fraction of the time that would be available for continuous operation, the aeration equipment must have a much higher capacity than that of a continuous aeration process.

SUMMARY OF THE INVENTION

The aforementioned problems are overcome in the present invention wherein a wastewater treatment apparatus includes a biotreatment tank and a floating clarifier within the biotreatment tank. More specifically, the apparatus for treating wastewater includes a tank, biotreatment means within the tank, a base or platform floating on wastewater within the tank, and means for clarifying biotreated wastewater mounted to and beneath the floating base.

In a preferred embodiment of the present invention, the means for clarifying the biotreated wastewater includes a wall mounted to and beneath the floating base and extending essentially above the surface of the wastewater to define an essentially uninterrupted perimeter of a clarification zone. A baffle panel mounted to the wall defines an apertured bottom of the clarification zone so that the suspended solids can settle and descend out the apertured bottom.

In another preferred embodiment of the present invention, the apertured bottom of the clarification zone includes a plurality of tented panels.

In yet another preferred embodiment, the baffle panel bottom of the clarifier is made of non-rigid material so that the baffle panel can oscillate or vibrate to prevent solids buildup on the panel surface.

The wastewater treatment apparatus of the present invention has several advantages. First, the apparatus combines biotreatment, equalization, and clarification within single tank. This combination allows a more compact design (i.e, a smaller "footprint") for the treatment plant and decreases the facility costs by reducing the piping and tankage costs. Further, the inventive wastewater treatment apparatus can operate continuously—even when the wastewater treatment level varies. In essence, the novel apparatus provides the advantages of a variable depth reactor (VDR) with the added advantage over the VDR of an integral clarification unit. Further, the clarifier discharges directly to the biological treatment means—thus eliminating the need for RAS pumping and piping. Also, the non-rigid bottom panel of the clarifier—which vibrates or oscillates due to the circulating wastewater outside the clarifier to reduce and preclude the buildup of solids on the panel surface—eliminates the need for a rake system or other additional means to reduce solids buildup in the clarifier.

These and other objects, advantages, and features of the invention will be more readily understood and appreciated by reference to the detailed description of the preferred embodiment and the drawings.

DETAILED DESCRIPTION OF THE PREFERRED EMBODIMENT

I. Summary

Figure 1:
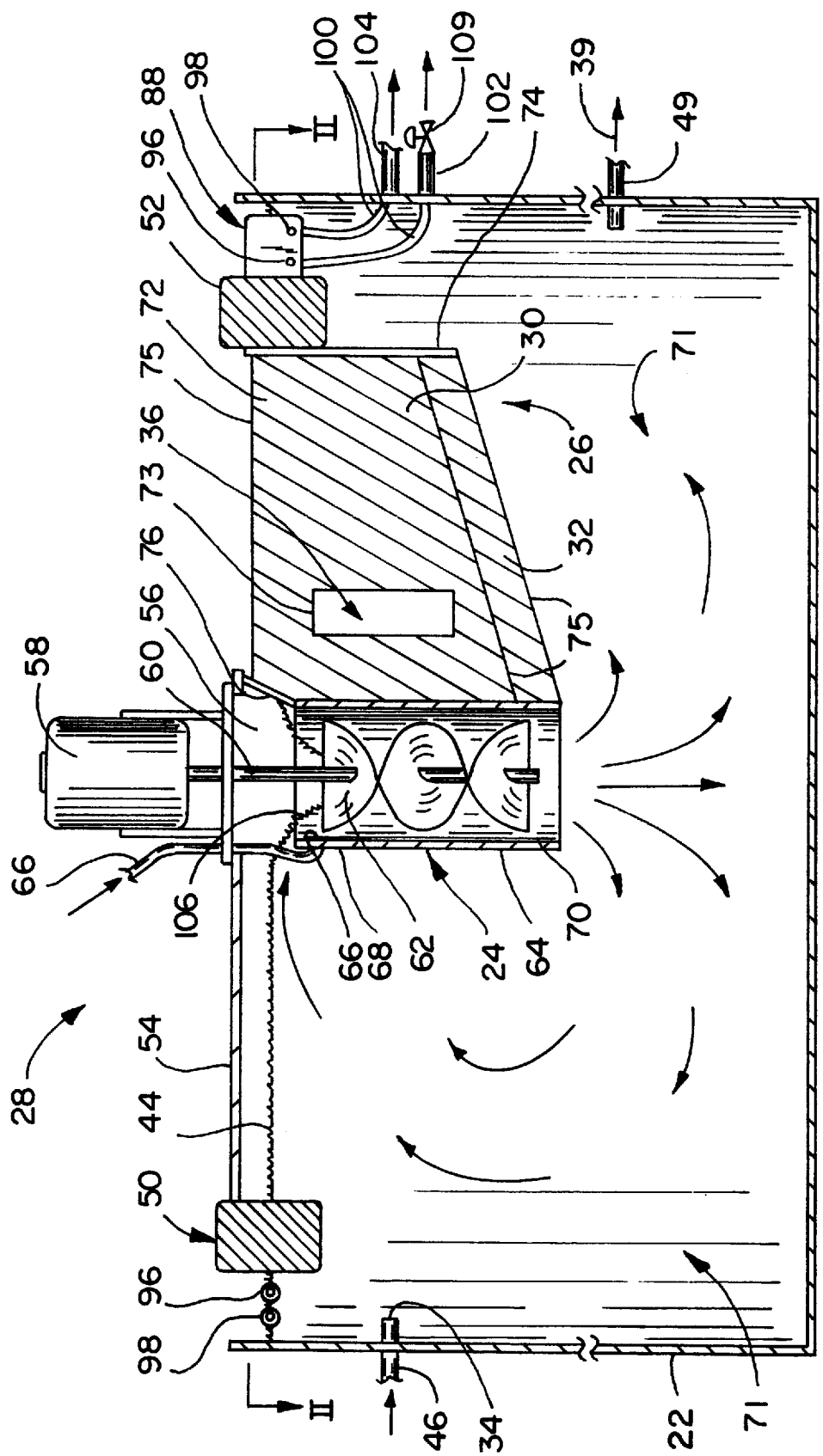
FIG. 1 is a vertical cross-section of the wastewater treatment apparatus of the present invention.
Figure 2:
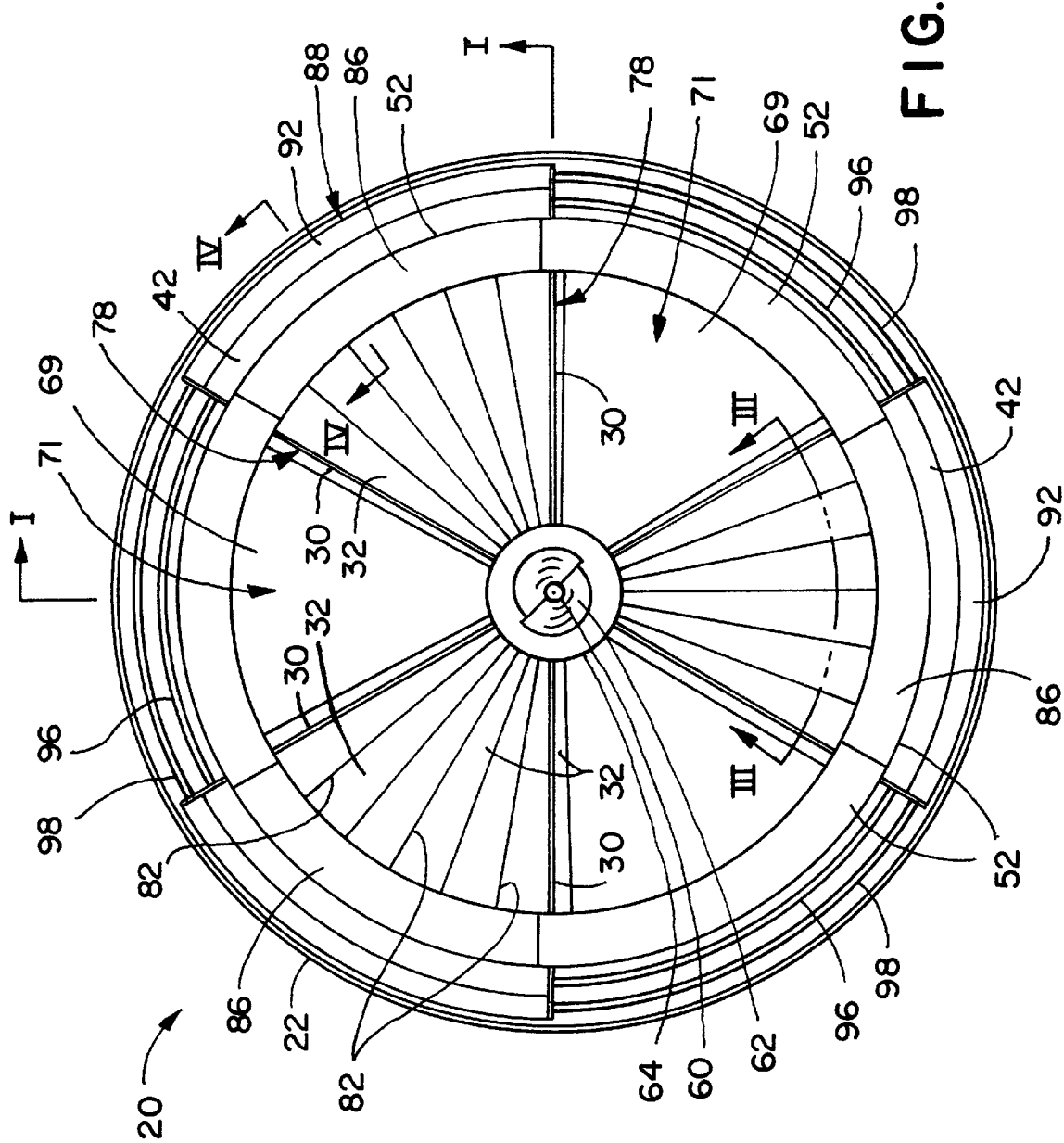
FIG. 2 is a horizontal cross-section taken along line II—II of FIG. 1.
Figure 3:
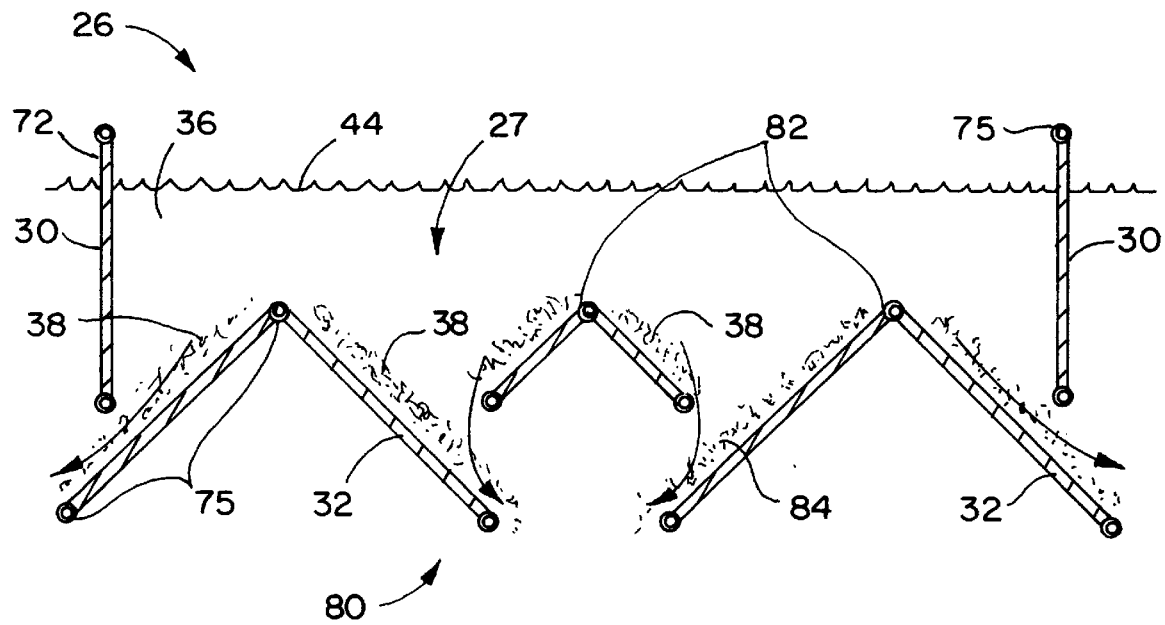
FIG. 3 is a side cross-section view taken along line III—III of FIG. 2.
Figure 4:
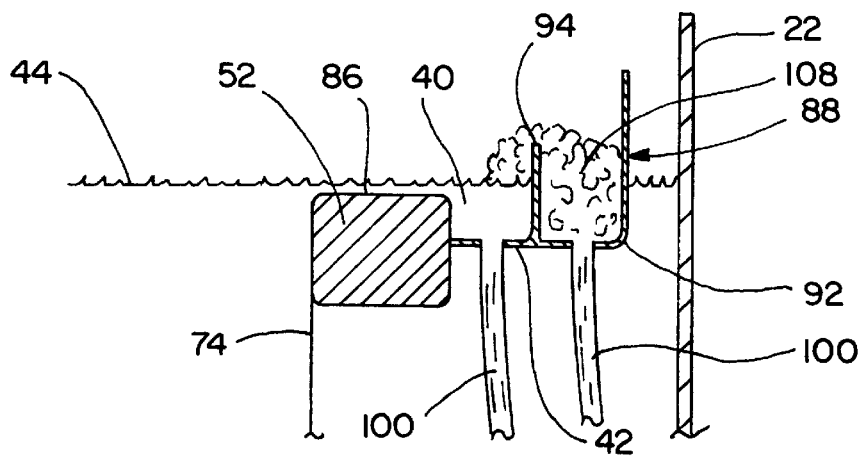
FIG. 4 is an enlarged cross-section view taken along line IV—IV of FIG. 2.

Referring to the drawings, FIG. 1 shows the wastewater treatment apparatus 20 of the present invention. Wastewater treatment apparatus 20 includes tank 22 enclosing both a biotreatment means 24 (i.e, means for aeration and mixing) and a clarification means 26. As shown in FIG. 2, the clarification means 26 is attached to floating base 28—which may also serve as the float assembly for the aerator 24. The clarification means includes one or more segmented (pie-shaped) chambers. FIG. 3 shows clarification zone 27 defined by clarifier walls 30 and baffle panels 32 of the clarification means. In operation, the wastewater 34 flows into tank 22 for continuous biotreatment. The biologically treated wastewater 36 flows into clarification means 26 so that suspended solids 38 will settle and continuously descend out of clarification means 26 into biotreatment zone 71. The clarified effluent 40 exits clarification means 26 for collection in effluent trough 42. The waste activated sludge 39 exits the tank 22 through outlet 49. (FIG. 4.) As the floating base 28 rises and falls with changes in the wastewater level 44, the clarifier remains at a uniform position with respect to the water level—thus providing an equalizing function with variation in the wastewater feed rate.

II. Detail of the Structure

Turning to FIG. 1, wastewater treatment apparatus 20 includes tank 22 having wastewater inlet 46 and waste activated sludge ("WAS") outlet 49. Tank 22 can be constructed of metal, such as steel, concrete, plastic, or other materials, as is known in the art. For new construction, steel is the preferred tank material because of the relative high strength and low cost. As used herein, "tank" includes lagoons and ponds.

Floating base 28 floats on the wastewater surface 44 within tank 22. Floating base 28 includes flotation means 50, such as a flotation ring 52, as is known in the art. As shown in FIG. 1, an optional top cover or hood 54 may be attached to flotation means 50 to form a airtight seal to define hood chamber 56 bounded by flotation means 50, hood 54, inner panel 76, and wastewater level 44, as is known in the art. However, an airtight hood chamber is not essential, for example, if ambient air is used as the biological reaction gas or the reaction gas is supplied in the side of draft tube 64, as discussed below. Floating base 28 may include sealing means (not shown) to form a seal with tank 22, as is known in the art.

Wastewater treatment apparatus 20 includes biological treatment means 24 within tank 22. Biological treatment means are known in the art, for example using aeration to oxygenate the biomass within the wastewater or anoxic digestion to convert organic compounds to cell mass without the availability of free oxygen. Aeration includes any means of gas-liquid mixing, including, but not limited to, coarse-bubble diffusion, plenum-chamber diffusion, advanced gas reactor (AGR) systems, draft tube aerators with a large ring below the impeller, and propulsion of the liquid into the gas above the liquid surface. See, for example, U.S. Pat. Nos. 5,035,795 to Schmid issued Jul. 30, 1991 entitled "Modular Clarifier with Integral Flocculator"; 5,009,816 to Wiese et al issued Apr. 23, 1991 entitled "Broad Liquid Level Gas-Liquid Mixing Operations"; Re 32,562 to Litz issued Dec. 15, 1987 entitled "Process and Apparatus for Mixing a Gas and a Liquid"; 4,681,711 to Eaton issued Jul. 21, 1987 entitled "Method and Apparatus for Aeration of Wastewater Lagoons"; 3,521,864 to Welles issued Jul. 28, 1970 entitled "Method and Apparatus for Controlling Oxygen Transfer and Power Requirements in a Water Aeration System"; and Scroggins & Deiters, *Wastewater Cleanup: Put Activated-Sludge Treatment to Work*, Environmental Engineering World, November–December 1995, at 22; each of which are incorporated herein by reference. The design of the size, orientation, and capacity of biotreatment means 24 can be determined by one of skill in the art depending on the design process conditions for the wastewater treatment system.

Continuing with FIG. 1, biological treatment means 24 includes motor 58 mounted on floating base 28. Impeller axle or shaft 60 connects impeller 62 to motor 58. Impeller 62 is positioned within draft tube 64, which is mounted to suspend beneath floating base 28. Draft tube 64 includes top or weir portion 68, which is positioned toward the water level 44, and bottom or exit portion 70, which is opposite the top portion 68. As shown in FIG. 1, reaction gas inlet 66 places a reaction gas source (not shown), such as a purified oxygen source or an air source, in fluid communication with draft tube 64. If ambient air is the reaction gas source, then the hood 54 and gas inlet 66 are optional. As shown in FIGS. 1 and 2, the biological treatment means 24 includes biotreatment zone 71, generally occupying the volume of the tank 22 not occupied by the clarification means 26. Thus, the biotreatment zone 71 includes the volume beneath the clarification means (FIG. 1) and one or more (e.g., three) segments 69 through which the circulating biotreated wastewater returns to the draft tube 64 (FIG. 2). The draft tube 64 is in fluid communication with the biotreatment chambers 71 and chamber 56.

Turning to FIGS. 1–3, wastewater treatment apparatus 20 includes clarification means 26 including one or more (e.g., three) separate pie-shaped segments or chambers. Clarification means 26 includes one or more pie-shaped floating clarifiers 72, which each have an essentially uninterrupted perimeter 78 comprising side panels 30, outer end panel 74, inner end panel 76, floatation ring 52, launderer 88, and draft tube 64. "Essentially uninterrupted perimeter" means a perimeter sufficiently complete to prevent the motion of wastewater 34 external to clarifier 72 from disturbing the settlement of suspended solids 38 within the biotreated wastewater 36 in clarifier 72. Clarifier walls or side panels 30 extend essentially above the liquid surface 44 and are connected to and extend between floatation ring 52 and the underfloat (not shown) supporting the draft tube 64. Floatation ring 52 also extends essentially above the liquid surface where connected to side panels 30 and launderer 88. A wall that is "essentially above the liquid surface" means that the upper end of the wall near wastewater surface 44 terminates at a point—whether above or below the wastewater surface—sufficient to minimize the disturbance that the motion of wastewater 34 external to clarifier 72 may cause to the settlement or concentration of suspended solids within biotreated wastewater 36 in clarifier 72. Side panel 30 defines clarifier inlet 73. Outer end panel 74 is connected to and extends between floatation ring 52 and both side panels 30. Inner end panel 76 extends from draft tube 64 to both side panels 30 and extends essentially above wastewater surface 44. A roof is not needed over the clarification means 26.

Bottom or baffle panels 32 extend from draft tube 64 to outer end panel 74. The baffle panels form an apertured bottom 80 of clarifier 72. The baffle panels are designed to maintain a fixed position relative to the side panels. The configuration of the bottom panels is designed to both (1) minimize the adverse effect to the quiescent or clarification zone 27 caused by the movement of the circulating wastewater in the biotreatment zone 71, (2) form a path 84 so that wastewater having a higher concentration of suspended solids can descend or flow out of the clarifier, and (3) slope upwardly from from the center of the tank to reduce the entrained reaction gas that may enter the clarification zone. In one aspect of the invention, each baffle panel 32 forms a tented shape with the crest 82 of the tent shape oriented toward the wastewater surface 44 and the sides of the baffle panels forming a 45 degree slope to minimize the collection of solids 38 on the panel surface. In this orientation, the tented baffle panels 32 overlap to define tortuous or angled outlet paths 84. The bottom panel 32 may itself be apertured (not shown) to provide an additional tortuous outlet path. Perimeter 78, apertured bottom 80, and waste water level 44 define clarification zone 27, which other than inlet 73 and outlet 84, is not in fluid communication with biotreatment means 24.

Panels 30, 32, 74, and 76 are made of structurally rigid material (e.g., sheet metal or plastic) or non-rigid, flexible material (e.g, fabric-backed reinforced polyvinyl chloride plastic sheet). The panel material may be a watertight or a water-impermeable material or other material capable of dampening water motion, as is known in the art. Preferably, the side and/or bottom panels 30 and 32 are made of non-rigid or flexible material, so that during operation, the panels oscillate or vibrate due to the circulating wastewater motion in the biotreatment segments 71. This vibration acts to dislodge settled solids 38 that may collect on the panel surface, as will be discussed in more detail below. Also preferably, outer and inner end panels 74 and 76 are made of rigid material to provide a mounting base for the side and bottom panels. Non-rigid panels 30 and 32 are attached to suspension cables 75 (FIG. 3), which are mounted on either end to inner and outer end panels 74 and 76 (FIG. 1).

The size, number, and capacity of clarification segments 26 can be determined by one of skill in the art depending on the process conditions for clarification. As is known in the art, clarification area depends on the hydraulic flow through the system. Generally, the clarification area required is calculated by dividing the flow by approximately 1,000 gallons per day per square foot. The depth of the clarifier 26 is preferably less than about 10 feet in order to maximize the volume of the biotreatment zone 71 and to minimize the amount of biotreatment space (i.e., capacity) that is taken up by the clarifier. Further, the clarifier segment can be designed to minimize the distance from the aerator (i.e., minimize the radius of the clarification segment) in order to save material and construction expense. In designing the size of the clarifier 26, the biotreatment wastewater return segment 69 must have a size sufficient to allow the biotreated fluid to flow from the biotreatment zone 71 and the draft tube 64.

Float ring 52 descends below the liquid-level inside perimeter 78 to form clarifier effluent weir outlet 86, which places clarification zone 27 in fluid communication with launderer 88 mounted on the outer side of flotation ring 52. (FIGS. 2 and 4) Launderer 88 includes effluent trough 42 and scum trough 92 separated by scum-trough weir 94. (FIG. 4) Launderer designs are known to those of skill in the art. Effluent pipes 96 connect the effluent troughs 42; similarly, scum trough pipes 98 connect scum troughs 92 (FIGS. 1 & 2). Flexible hoses or pipes 100 place effluent trough 42 and scum trough 92 in fluid communication with effluent outlet 102 and scum outlet 104, respectively (FIG. 1). Flexible hose 100 is of a length sufficient to permit floating clarifier 26 to rise and fall with wastewater fluid level 44. Effluent outlet valve 109 (FIG. 1) is adjustable to set the desired constant outflow of effluent, as is known in the art.

III. Operation of the Wastewater Treatment Apparatus

In operation, wastewater 34 is pumped into the wastewater treatment apparatus 20 through inlet 46. Reaction gas (e.g., oxygen or air) is pumped through inlet 66 or, if ambient air is used as the reaction gas, aspirated into the aerator/mixing unit 24. Motor 58 rotates impeller 62 to create a vortex 106 that draws the wastewater over the draft tube top or weir portion 68 from the biotreatment segments 71, as one example of the biological treatment means. The impeller 62 also draws the reaction gas down to intimately mix the gas-liquid and force the mixture out the bottom 70 of draft tube 64. This downward pumping action of aerated liquor set up both a primary and secondary flow regime in the tank which uniformly mixes both the gas and suspended solids, as is known in the art and previously discussed.

A portion of the circulating biotreated wastewater 36, which contains suspended solids 38 enters floating clarifier 72 through inlet 73. The clarifier provides a quiescent or clarification zone in which the suspended solids 38 settle. The bottom or baffle panels 32 are oriented to minimize the disturbance or flow of the circulating wastewater in biotreatment zone 71 to the quiescent clarification zone 27. In the clarifier, the suspended solids descend by gravity through tortuous path 84 and exits apertured bottom 80 of the floating clarifier into biotreatment zone 71. According to a preferred embodiment, the side and/or bottom panels made of non-rigid material oscillate or vibrate from the circulation of the wastewater in the biotreatment zone 71. This oscillation, along with the sloped angle of the bottom panels, minimizes the amount of solids 38 that collect on the panel walls. Thus, the clarifier avoids the need for a rake system to re-entrain solids that become unsuspended. The solids 38 that are not suspended also descend out of apertured bottom 80 to become re-entrained by the circulating biotreated wastewater in the biotreatment zone 71.

A portion of the biotreated wastewater gravity flows out exit 49 as waste activated sludge ("WAS") for further treatment in thickener and/or dewatering operations, as is known in the art. The amount of WAS removed from the biotreatment system depends on the desired "mean cell residence time" or "food to micro-organism" (F/M) ratio, as is known in the art.

Turning to FIG. 4, the clarified effluent 40 at the top of the clarification zone 27 passes out of the clarifier over outlet weir 86 for collection in trough 42. The scum 108 that may float on the surface of the clarified effluent spills over the scum trough weir 94 for collection in the scum trough 92. The clarified effluent 40 and the scum 108 gravity flow through flexible hoses 100 to exit the wastewater treatment apparatus 20 for further processing or release to the environment, as may be appropriate. The clarified effluent passes through adjustable control valve 109 (FIG. 1), which can be set to maintain the desired constant outlet flow of effluent.

Since the clarification unit is mounted on the floating base 28 and the launderers 88 are connected to the tank scum and effluent outlets by flexible hoses, clarification continues during changes in wastewater fluid level 44. The wastewater treatment apparatus 20 has equalization capacity within tank 22 to handle surges in wastewater input, while affording continuous operation of both the biotreatment means and the clarification means contained within a single tank.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents.

The embodiments of the invention in which an exclusive property or privilege is claimed are defined as follows:

1. An apparatus for treating wastewater comprising:
    a tank;
    a base adapted to float on wastewater within said tank;
    means within said tank for biotreating wastewater to produce biotreated wastewater; and
    means mounted to and beneath said base for clarifying the biotreated wastewater, said clarification means including:
    a wall mounted to and beneath said base to define an essentially uninterrupted perimeter of a clarification zone, said wall extending essentially above the surface of the wastewater;
    means to allow biotreated wastewater to enter said clarification zone; and
    a baffle panel constructed of non-rigid material and mounted to said wall to define an apertured bottom of said clarification zone, wherein suspended solids can descend out said bottom of said clarification zone to the biotreated wastewater and said non-rigid baffle panel is capable of oscillating in response to the flow of wastewater therealong to reduce the buildup of solids on said baffle panel.

2. The apparatus of claim 1 wherein said baffle panel is tented.

3. The apparatus of claim 2 further comprising a plurality of tented panels mounted to said wall to define an apertured bottom having a plurality of tortuous outlets.

4. The apparatus of claim 1 wherein said wall includes a plurality of panels.

5. The apparatus of claim 1 wherein said biotreatment means includes aeration.

6. The apparatus of claim 1 wherein said tank and biotreatment means comprise a variable depth reactor.

7. An apparatus for treating wastewater comprising:
    a tank;
    a base adapted to float on wastewater within said tank;
    means within said tank for aerating wastewater to produce biotreated wastewater; and
    means for clarifying the biotreated wastewater including:
    a wall mounted to and beneath said base, said wall defining an essentially uninterrupted perimeter of a clarification zone, said wall extending essentially above the surface of the wastewater;
    a plurality of tented panels constructed of non-rigid material and mounted to said wall to define an apertured bottom of said clarification zone, said apertured bottom having a plurality of tortuous outlets, whereby suspended solids can descend out said bottom of said clarification zone and said tented panels are capable of vibrating in response to the flow of wastewater therealong to reduce the buildup of solids on said tented panels and whereby the wastewater level within said tank can vary while said aeration and clarification means operate continuously.

8. An apparatus for clarifying wastewater comprising:
    a base adapted for floating on wastewater;
    a wall mounted to and beneath said base to define an essentially uninterrupted perimeter of a clarification zone, said wall extending essentially above the surface of the wastewater; and
    a baffle panel constructed of non-rigid material and mounted beneath said base to define an apertured bottom of said clarification zone, whereby suspended solids can descend out said bottom of said clarification zone and said baffle panel is capable of oscillating in response to the flow of wastewater therealong to reduce the buildup of solids on said baffle panel.

9. The apparatus of claim 8 wherein said baffle panel is tented.

10. The apparatus of claim 8 further comprising a plurality of tented panels mounted beneath said base to define an apertured bottom having a plurality of tortuous outlets.

11. The apparatus of claim 10 wherein said wall includes a plurality of side panels.

12. The apparatus of claim 11 wherein said tented panels are mounted to a plurality of suspension cables connected to said wall.

13. The apparatus of claim 8 wherein said baffle panel is mounted to a suspension cable connected to said wall.

14. An improved variable depth reactor for treating wastewater wherein the improvement comprises incorporating the apparatus of claim 8 within said variable depth reactor.

15. A method for continuously treating wastewater comprising:
    introducing wastewater including suspended solids into a biotreatment tank, said biotreatment tank enclosing a base adapted to float on the wastewater within said tank;
    biotreating the wastewater in said biotreatment tank by mixing the wastewater with reaction gas to produce biotreated wastewater;
    introducing the biotreated wastewater into a clarifier mounted to and beneath said floating base, said clarifier including a non-rigid baffle panel that defines an apertured bottom of said clarifier;
    clarifying the biotreated wastewater so that the the suspended solids descend out said bottom of said clarifier to return to said biotreatment tank;
    said non-rigid baffle panel oscillating in response to the movement of the wastewater being biotreated in the biotreatment tank to dampen the disturbance of the biotreatment step to the clarifying step and to reduce the buildup of solids on said baffle panel, whereby the wastewater level within said biotreatment tank can vary while said biotreatment and clarification steps operate continuously.

16. The method of claim 15 wherein said clarifier includes a plurality of tented, non-rigid baffle panels to define an apertured bottom having a plurality of tortuous outlets.

17. The method of claim 15 wherein said biotreatment step includes aeration.

* * * * *